United States Patent
Hughes

[15] 3,674,661
[45] July 4, 1972

[54] ELECTROCHEMICAL PRODUCTION OF NICKEL (I) COMPLEXES

[72] Inventor: William B. Hughes, Bartlesville, Okla.
[73] Assignee: Phillips Petroleum Company
[22] Filed: March 1, 1971
[21] Appl. No.: 119,942

[52] U.S. Cl. .................................. 204/73 R, 260/439 R
[51] Int. Cl. ................. C07b 29/06, C07f 9/02, C07f 15/04
[58] Field of Search ........................... 204/73 R; 260/439 R

[56] References Cited

UNITED STATES PATENTS

| 3,395,165 | 7/1968 | Feltham | 260/439 R |
| 3,472,887 | 10/1969 | Carriel et al. | 260/439 R |
| 3,556,961 | 1/1971 | Bigot et al. | 204/73 A |

Primary Examiner—F. C. Edmundson
Attorney—Young and Quigg

[57] ABSTRACT

The treatment of nickel(II) halide compounds by controlled potential electrolysis is disclosed for the production of nickel(I) halide phosphine compounds.

8 Claims, No Drawings

ELECTROCHEMICAL PRODUCTION OF NICKEL (I) COMPLEXES

This invention relates to the production of nickel(I) complexes. It further relates to the conversion of nickel(II) complexes to nickel(I) complexes. This invention still further relates to the electrochemical reduction of nickel(II) halides to produce nickel(I) halide phosphine compounds.

The nickel(I) halide phosphine complexes in admixture with Lewis acids are well known by those skilled in the art to be useful in the dimerization of olefins. In this regard see, for example, *Chemistry and Industry*, June 3, 1967, at pg. 921. Furthermore, it is also known by those skilled in the art that nickel(I) halide phosphine complexes can be prepared by a multistep process. In this regard see, for example, *Angew. Chem. internat. Edit.*, Vol. 3, No. 9 (1964) at pg. 648, and *Chemical Communications* (1967) at pg. 228, both of which describe the preparation of nickel(I) halide phosphines by a series of chemical reactions. Both methods are multistep syntheses which require preparation of pi-allyl nickel(II) halides, or zero valent nickel derivatives, such as tetrakis (triphenylphosphine)nickel(G&), as starting materials. The nickel(I) halide phosphines have been prepared from the above starting materials by treating the pi-allyl nickel(II) halide with triphenylphosphine, by partial oxidation of tetrakis(triphenylphosphine)nickel(0) with a halogen, and by the disproportionation of bis(triphenylphosphine)nickel(II) halide with tetrakis(triphenylphosphine)nickel(0).

The above mentioned starting materials, not only must be prepared prior to the preparation of the desired nickel(I) compounds but they are also difficult to handle and purify because they are sensitive to and tend to degrade in air. In addition to the starting material difficulties, the desirable nickel(I) compounds prepared by the above reactions are multistep processes and therefore cumbersome and inconvenient There is thus a requirement for a single-step process for the preparation of nickel(I) halide phosphines from ordinary commercially available nickel(II) compounds.

It is thus an object of this invention to provide a process for the production of olefin dimerization catalysts.

It is another object of this invention to provide an electrochemical process whereby nickel(II) halide compounds are reduced to nickel(I) halide phosphine compounds.

Other objects, aspects, and the many advantages of this invention will be apparent to one skilled in the art from a study of the following disclosure and appended claims.

I have now discovered that nickel having a valence of plus one is produced by electrochemically reducing nickel having a valence of plus two. More specifically, it is my discovery that nickel(I) halide phosphine compounds are produced when solutions of nickel(II) halide compounds, in the presence of phosphorous-containing adjuvants, are subjected to controlled electrical potential electrolysis, i.e., controlled potential electrolysis.

The expression "controlled potential electrolysis" or "controlled electrical potential electrolysis" is defined herein to designate the electrochemical process wherein a substantially constant voltage, herein the reduction potential, is applied across the electrodes of an electrochemical cell throughout the entire period of electrical current flow during which time the desired reduction reaction is proceeding. According to the process of this invention, although some variation in voltage is permissible, individual reductions are conducted preferably at substantially constant potentials within the range of −1.0 to −1.6 volts and more preferably within the range of −1.2 to −1.4 volts. The controlled potential must be sufficient to cause the desired reduction of the nickel(II) complexes, but must be less than the reduction potential of the solvent. Electrical current, under the influence of the applied constant voltage, passes through the electrolytic cell until the desired reduction is complete. The initial current can vary between 10 and 500 milliamperes (mA), but is preferably 100 mA, and decreases (at constant potential) during the course of the reduction. Theoretically, when the current is 0 mA the reduction is complete. However, the reduction can be considered substantially complete and if desired the applied voltage can be terminated when the current is less than 5 mA.

The nickel(II) halide compounds of particular use in my invention are those represented by the following general formulas:

and

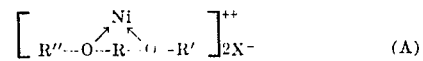   (A)

   (B)

wherein the symbol "↑" is indicative of a coordinate bond.

For convenience, formula (A) is represented by the formula $NiX_2 \cdot Y$ and formula (B) is represented by the formula $NiX_2 \cdot Z_2$, wherein X is a halogen selected from the group consisting of chlorine, bromine, and iodine; Y is representative of the group R″OROR′ wherein R is an alkylene radical having two to three carbon atoms, R′ is an alkyl radical having one to three carbon atoms, and R″ is selected from the group consisting of hydrogen, alkyl radicals having one to three carbon atoms, hydroxy alkyl radicals having one to three carbon atoms, and alkoxyalkyl radicals containing three to five carbon atoms; and Z is representative of the group $PL_3$ wherein L is selected from aryl and alkaryl radicals having six to 12 carbon atoms.

It is not required that each L group in each compound represented by formula (B) be the same. The L groups in any particular compound can be either the same or different (or mixtures) from each other L group in the compound so long as each L group is as defined above. In short, each L group is, optionally, different from each other L group.

The nickel(II) halide compounds utilized in the process of my invention can be at least one compound selected from the compounds represented by the formulas (A) and (B) or mixtures thereof.

The following compounds fall within the scope of the above formulas (A) and (B) but are merely illustrative rather than limitative of the nickel(II) halide compounds useful in my invention. Accordingly, these compounds include nickel dichloride·2-methoxyethanol, nickel dichloride·1,2-dimethoxyethane, nickel dichloride·bis(2-ethoxyethyl) ether, nickel dibromide · bis(2 · 2-(2-methoxyethoxy)ethanol, bis(triphenylphosphine)-nickel dichloride, bis(tri-alpha-naphthylphosphine)nickel dibromide, bis(triphenylphosphine)nickel dibromide, nickel diiodide · 1,3-dipropoxypropane, bis(4-n-hexylphenylphosphine)nickel dichloride, nickel dichloride · bis (2-propoxyethyl) ether, nickel dibromide · 3-(2-methoxyethoxy)-propanol, nickel dibromide · bis(3-ethoxypropyl) ether, and nickel dichloride bis(3-methoxypropyl) ether. The preferred compounds for each of the formulas (A) and (B) are nickel dichloride · 1,2-dimethoxyethane, and bis(triphenylphosphine)nickel dichloride respectively.

The phosphorus-containing adjuvants useful herein include at least one compound, or mixtures of compounds, selected from the group of compounds represented by the general formula

   (C)

wherein: L' is selected from aryl and alkaryl radicals having six to 12 carbon atoms. It is not required that each L' group in each compound represented by formula (C) be the same. The L' groups in any particular compound can be either the same or different (or mixtures) from each other L' group in the compound so long as each L' group is as defined above. In short, each L' group is, optionally, different from each other L' group.

The following compounds fall within the scope of formula (C), but are merely illustrative rather than limitative of the phosphorus-containing adjuvants useful in my invention. Accordingly, these compounds include tri-p-tolylphosphine, tri-o-tolylphosphine, triphenylphosphine, tri-alpha-naphthylphosphine, tri(n-hexylphenyl)phosphine, di(p-tolyl)phenylphosphine, and di(p-tolyl)-alpha-naphthylphosphine. The preferred compound is triphenylphosphine.

In the process of my invention the molar ratio of the above described phosphorus-containing adjuvant to the above described nickel(II) halide compound is in the range of 10:1 to 1:1 and preferably in the range of 4:1 to 3:1.

The electrochemical process is preferably conducted at a temperature within the range of 0° to 40°C. and more preferably at a temperature within the range of 20° to 30°C.

The nickel(II) halide compounds useful herein are soluble in certain polar organic compounds, and the process is conducted with the nickel(II) halide compound being substantially in solution. Suitable solvents are those that are non-reducible and nonreactive under the conditions of the electrochemical reaction. The solvents preferred are nitriles, amides, ethers and mixtures thereof. The preferred solvents are conducive to high current densities which permit the reduction reaction to proceed with rapidity and in which the nickel(II) halide compounds are highly soluble. Such preferred solvents include N,N-dimethylformamide and acetonitrile. Other useful solvents include, but are not limited to, N,N-diethylformamide, N,N-dimethylacetamide, N,N-diethylacetamide, propionitrile, butyronitrile, tetrahydrofuran, iso-butyronitrile, 1,2-dimethoxyethane, bis(2-ethoxyethyl) ether, and bis(2-methoxyethyl) ether.

The quantity of solvent required is not of critical importance, however, a sufficient quantity is employed to maintain the nickel(II) halide compound substantially in-solution throughout the entire period of the reaction.

To support and maintain the electrolytic reaction throughout the entire period of reaction, a supporting electrolyte can, optionally, be utilized in the electrolytic system. If it is elected to employ a supporting electrolyte it is preferably a tetraalkyl ammonium salt wherein the electrolyte does not enter into the reaction and is not otherwise affected by the applied electrical potential. The alkyl has in the range of one to eight carbon atoms and the particular ammonium salt can be a halide, a nitrate, or a perchlorate.

The quantity of supporting electrolyte which can be present is in the range of 0 to 10 moles of electrolyte per mole of nickel(II) halide compound.

Representative supporting electrolytes include tetra-n-butylammonium bromide, tetra-n-butylammonium chloride, tetra-n-butylammonium perchlorate, tetra-n-butylammonium nitrate, tetraethylammonium perchlorate, tetra-n-heptylammonium bromide, tetra-n-octylammonium iodide, and tetramethylammonium chloride, while tetra-n-butylammonium perchlorate is preferred.

The electrochemical reaction is preferably conducted under a substantially inert atmosphere such as an atmosphere consisting of 96 weight percent nitrogen and 4 weight percent hydrogen and 1 atmosphere pressure. The controlled potential electrolysis can be conducted in any suitable apparatus such as a U-shaped cell consisting of an anode compartment and a cathode compartment separated by a sintered glass disc wherein each of the two compartments is equipped with a terminal, preferably, a platinum wire sealed through the cell walls near the base of each compartment. The cathode compartment is additionally fitted with appropriate means, such as a ground glass joint, to hold a reference electrode assembly. Sufficient mercury to function as anode and cathode is supplied to both compartments to just cover the above mentioned platinum wire terminals. Power is supplied to the cell via the anode and cathode from a source suitable to supply a constant voltage, such as a Kempco Model 60-0.5 power supply used in conjunction with a Heath voltage reference source. The power is supplied until the electrical current flow, as previously mentioned, is less than 5 mA.

Alternatively, a cylindrical platinum electrode can be used as the cathode, and a mercury pool as the anode.

The reference electrode referred to above can consist of a glass tube containing a silver wire immersed in a 0.001 M solution of silver perchlorate in acetonitrile. The reference electrode is connected to the electrolysis system by attachment to the positive terminal of the voltage reference source and to the cathode compartment of the U-shaped cell through a salt bridge solution. The salt bridge can be an acetonitrile solution of a supporting electrolyte such as tetrabutylammonium perchlorate. The reference electrode in conjunction with the voltage reference source regulates the applied voltage to the desired constant value for the controlled potential electrolysis.

All electrochemical work can be conveniently conducted in a Vacuum Atmospheres Corporation, Dry-Lab/Dry-Train Apparatus which is similar to the apparatus described above.

In a typical example, the reaction mixture consistinG of a nickel(II) halide compound, a phosphorus containing adjuvant, a solvent, and a supportinG electrolyte (optional) is placed in the cathode compartment of the above described cell, and a solution of supporting electrolyte is placed in the anode compartment of the above described cell. The current is passed through the cell and when the reaction is complete, as indicated by the low current, the resulting nickel(I) halide phosphine compound, which is in the form of a precipitate in the cathode compartment, can then be recovered by filtration and solvent washing to remove unreacted nickel(II). As previously stated, the use of a supporting electrolyte in the cathode compartment is optional. If an electrolyte is not used the desired nickel(I) product, which is a precipitate, is more easily obtained in a purer state.

The following examples are provided to further illustrate and are accordingly not limitative of the process of my invention. It will be noted that Examples I, III, and V illustrate the electrochemical process of my invention, wherein Example I utilizes compounds with the scope of formulas (A) and (C), Example III utilizes compounds within the scope of formulas (B) and (C), and Example also utilizes compounds with the scope of formulas (B) and (C). Examples II, IV and VI illustrate the use of the nickel (I) halide phosphine compounds produced according to my invention in Examples I, III, and V, respectively, in combination with a Lewis acid to dimerize an olefin.

EXAMPLE I

A solution of 0.44 g (2.0 mmoles) nickel dichloride·1,2-dimethoxyethane, 1.58 g (6.0 mmoles) triphenylphosphine, and 1.72 g (0.5 mmole) tetra-n-butylammonium perchlorate in 50 ml acetonitrile was reduced over a period of 67 minutes at −1.2 volts using as the cathode a cylindrical platinum electrode. The solution in the cathode compartment was filtered to recover a yellow solid which was washed with acetonitrile followed by ether to give a product weighing 1.01 g. Recrystallization of the product from acetonitrile/benzene gave yellow crystals of tris(triphenylphosphine)nickel(I) chloride,($C_{54}H_{45}ClNiP_3$).

|  |  | %C | %H | %Ni |
|---|---|---|---|---|
| Calculated analysis | of $C_{54}H_{45}ClNiP_3$: | 73.6 | 5.1 | 6.7 |
| Found: |  | 72.5 | 5.1 | 6.6 |

EXAMPLE II

A 0.31 g (0.35 mmole) sample of tris(triphenylphosphine)nickel(I) chloride (from Example I), 0.13 g (1.0 mmole) aluminum chloride, and 20 ml chlorobenzene were charged to a Fisher-Porter bottle and a red-brown homogeneous mixture resulted. The reactor was sealed, chilled in an ice bath and pressured with propylene so as to maintain 30 psig in the system over a period of 60 minutes. During this reaction period, the mixture was stirred and showed a gain of 23.5 g. The system was vented to the atmosphere, diluted with 10 ml of water, and the aqueous and organic layers were separated. The aqueous phase was extracted with chlorobenzene, and the extract combined with the organic phase. After drying the chlorobenzene solution over anhydrous magnesium sulfate, a distillation of the product mixture gave 15.1 g of propylene dimers boiling at 63° to 85°C. Hydrogenation of this fraction over platinum oxide at 30–48 psig for 5 hours gave a mixture of hexanes. Gas chromatographic analysis of the hexane mixture showed the following composition (area percent):

| | |
|---|---|
| 2-methylpentane | 70.0 |
| n-hexane | 22.0 |
| 2,3-dimethylbutane | 8.0 |

EXAMPLE III

A solution of 0.65 g (1.65 mmoles) bis(triphenylphosphine)nickel(II) dichloride, 0.26 g (1.0 mmole) triphenylphosphine, and 0.86 g (0.25 mmole) tetra-n-butylammonium perchlorate in 25 ml acetonitrile was reduced over a period of 69 minutes at −1.2 volts using mercury pool electrodes. The solution in the cathode compartment was filtered to recover a yellow solid which was washed with acetonitrile to give a product weighing 0.5 g. Recrystallization of the product from benzene/acetonitrile gave gold crystals of tris(triphenylphosphine)nickel(I) chloride, ($C_{54}H_{45}ClNiP_3$).

| | | %C | %H | %Cl |
|---|---|---|---|---|
| Calculated analysis | of $C_{54}H_{45}ClNiP_3$: | 73.6 | 5.1 | 4.0 |
| Found: | | 72.9 | 5.2 | 4.8 |

EXAMPLE IV

A 0.2 g (0.23 mmole) sample of tris(triphenylphosphine)nickel(I) chloride (from Example III), 0.10 g (0.75 mmole) aluminum chloride, and 20 ml chlorobenzene were charged under nitrogen to an 8-ounce beverage bottle. A red-brown homogeneous mixture resulted within 5 minutes. The bottle was capped, chilled in an ice bath, and pressured with propylene so as to maintain 30 psig in the system over a period of 71 minutes. The reaction was quenched by the addition of 10 ml aqueous salt solution. The organic and water layers were separated, and the water layer was washed with two 5 ml aliquots of chlorobenzene. These chlorobenzene extracts were combined with the above organic phase, and the mixture was dried over anhydrous magnesium sulfate. Distillation gave 17.3 g of propylene dimers. Hydrogenation of a 2 ml sample of the distillate over platinum oxide at 30 psig hydrogen gave $C_6$ paraffins. Glpc analysis (20 ft. isoquinoline column, 29°C) of the hydrogenated product showed the following composition (area percent):

| | |
|---|---|
| 2,3-dimethylbutane | 7.0 |
| 2-methylpentane | 72.0 |
| n-hexane | 21.0 |

EXAMPLE V

A solution of 0.74 g (0.80 mmole) bis(triphenylphosphine)nickel(II) bromide, 0.26 g (1.0 mmole) triphenylphosphine, and 0.86 g (0.25 mmole) tetra-n-butylammonium perchlorate in 25 ml acetonitrile was reduced over a period of 36 minutes at −1.2 volts using mercury pool electrodes. The solution in the cathode compartment was filtered to recover a yellow solid which was washed with acetonitrile to give a product weighing 0.41 g. Recrystallization of the product from benzene/acetonitrile gave gold crystals of tris(triphenylphosphine)-nickel(I) bromide, ($C_{54}H_{45}BrNiP_3$).

| | | %C | %H | %Br |
|---|---|---|---|---|
| Calculated analysis | of $C_{54}H_{45}BrNiP_3$: | 70.0 | 4.9 | 8.7 |
| Found: | | 68.5 | 5.0 | 9.5 |

EXAMPLE VI

A 0.21 g (0.23 mmole) sample of tris(triphenylphosphine)nickel(I) bromide (from Example V) 0.10 g (0.75 mmole) aluminum chloride, and 20 ml chlorobenzene were charged under nitrogen to an 8-ounce beverage bottle. A dark brown homogeneous mixture resulted within 5 minutes. The bottle was capped, chilled in an ice bath, and pressured with propylene so as to maintain 30 psig in the system over a period of 64 minutes. Workup and product isolation were essentially the same as described above in Examples II and IV, and gave 10.76 g propylene dimers. The reduced yield of dimers was due to accidental spill prior to distillation. Glpc analysis showed that the hydrogenated dimer sample had the following composition (area percent):

| | |
|---|---|
| 2,3-dimethylbutane | 6.0 |
| 2-methylpentane | 73.0 |
| n-hexane | 21.0 |

The data of Examples II, IV and VI show that propylene was dimerized to mixtures of 2-methylpentene, hexene, and 2,3-dimethylbutene over the tris(triphenylphosphine)nickel(I) chloride/aluminum chloride catalyst. These products were hydrogenated to the corresponding paraffins.

Reasonable variations and modifications of this invention can be made, or followed, in view of the foregoing disclosure, without departing from the spirit or scope thereof.

That which is claimed is:

1. An electrochemical process for the production of a nickel(I) halide phosphine compound comprising applying a controlled electrical potential to a nickel(II) halide compound solution in the presence of a phosphorus-containing adjuvant wherein said controlled potential is in the range of −1.0 to −1.6 volts, and further wherein said nickel(II) halide compound is at least one compound selected from the compounds represented by the general formulas $NiX_2·Y$, and $NiX_2·Z_2$ wherein: X is a halogen selected from the group consisting of chlorine, bromine, and iodine; Y is representative of the group R″OROR′ wherein R is an alkylene radical having two to three carbon atoms, R′ is an alkyl radical having one to three carbon atoms, and R″ is selected from the group consisting of hydrogen, alkyl radicals having one to three carbon atoms, hydroxy alkyl radicals having one to three carbon atoms, and alkoxyalkyl radicals containing three to five carbon atoms, and Z is representative of the group $PL_3$ wherein L is selected from aryl and alkaryl radicals having six to 12 carbon atoms, and said phosphorus-containing adjuvant is at least one compound selected from the compounds represented by the general formula $PL'_3$ wherein: L' is selected from aryl and alkaryl radicals having six to 12 carbon atoms.

2. The process of claim 1 wherein the molar ratio of said adjuvant to said nickel(II) halide compound is in the range of 10:1 to 1:1.

3. The process of claim 2 conducted in a supporting electrolyte comprised of a tetraalkylammonium salt wherein said ammonium salt is not affected by said electrical potential and said alkyl has in the range of one to eight carbon atoms.

4. The process of claim 3 wherein a suitable solvent for said nickel(II) halide compound is selected from the group comprising nitriles, amides, ethers and mixtures thereof.

5. The process of claim 4 wherein said nickel(II) halide compound is one of nickel dichloride·1,2-dimethoxyethane, bis(triphenylphosphine)nickel dichloride, and bis(triphenylphosphine)nickel dibromide, and said phosphorus-containing adjuvant is triphenylphosphine.

6. The process of claim 5 wherein said solvent is acetonitrile and said supporting electrolyte is tetra-n-butylammonium perchlorate.

7. The product of the process of claim 1.

8. The product of the process of claim 6.

* * * * *